United States Patent [19]

Das et al.

[11] Patent Number: 4,950,532
[45] Date of Patent: Aug. 21, 1990

[54] PROCESS FOR PRODUCING GLASS FIBER REINFORCED THERMOPLASTIC COMPRESSION MOLDED MATERIALS AND SAID MOLDED MATERIALS

[75] Inventors: Balbhadra Das, Allison Park; Narasimhan Raghupathi, Murrysville; Thomas V. Thimons, Allison Park, all of Pa.

[73] Assignee: Azdel, Inc., Shelby, N.C.

[21] Appl. No.: 925,015

[22] Filed: Oct. 30, 1986

[51] Int. Cl.$^5$ ............... B29C 43/02; B29C 67/14
[52] U.S. Cl. .................. 428/290; 428/285; 428/300; 264/257; 264/258; 264/325; 264/327; 264/DIG. 65
[58] Field of Search ........... 264/257, 258, 322, 319, 264/325, 327, DIG. 65; 428/220, 283, 285, 287, 284, 286, 30

[56] References Cited

U.S. PATENT DOCUMENTS

| | | | |
|---|---|---|---|
| 3,414,455 | 12/1968 | Twomey, Jr. et al. | 428/328 |
| 3,607,500 | 9/1971 | Field | 264/257 |
| 3,699,920 | 6/1972 | Haggis et al. | 260/37 N |
| 4,044,188 | 8/1977 | Segal | 428/283 |
| 4,080,349 | 3/1978 | Wurmb et al. | 260/28 R |
| 4,091,061 | 5/1978 | Turbier et al. | 264/257 |
| 4,098,943 | 7/1978 | Degginger et al. | 428/283 |
| 4,240,857 | 12/1980 | DellaVecchia et al. | 156/209 |
| 4,263,364 | 4/1981 | Seymour et al. | 428/287 |
| 4,276,346 | 6/1981 | Bramwell | 428/286 |
| 4,316,934 | 2/1982 | Maier et al. | 264/257 |
| 4,379,801 | 4/1983 | Weaver et al. | 428/283 |
| 4,379,802 | 4/1983 | Weaver et al. | 428/283 |
| 4,414,266 | 11/1983 | Archer et al. | 428/287 |
| 4,487,647 | 12/1984 | Semeghini et al. | 156/181 |
| 4,489,031 | 12/1984 | Ogihara | 264/319 |
| 4,544,701 | 10/1985 | Walker et al. | 428/290 |

OTHER PUBLICATIONS

Azdel Reinforced Thermoplastic Moldable Sheet brochure.

Primary Examiner—Jay H. Woo
Assistant Examiner—Jeremiah F. Durkin, II
Attorney, Agent, or Firm—Kenneth J. Stachel

[57] ABSTRACT

Fiber reinforced thermoplastic parts having good surface characteristics are produced by a process involving: preheating fiber reinforced composite to achieve at least a flowable viscosity of the polymer, and (2) molding under controlled rheological conditions. The preheating is conducted on composites that are predominantly amorphous thermoplastic polymers, copolymers, polyblends or alloys reinforced with continuous glass fiber strand reinforcing mat. The amount of the mat present in the laminate is less than around 40 weight percent of the composite. The temperature of preheating is at least greater than the glass transition temperature of the polymer and less than the degradation temperature of the polymer to expand the composite. The preheated composites are compression molded in an effective charge and at a pressure of at least around 500 to 6,000 psi, where at least one die surface of the mold is maintained at a temperature in the range of the glass transition temperature of the polymer to a temperature of 70° F. (39° C.) below the glass transition temperature of the polymer.

23 Claims, 2 Drawing Sheets

PROCESS FOR PRODUCING GLASS FIBER REINFORCED THERMOPLASTIC COMPRESSION MOLDED MATERIALS AND SAID MOLDED MATERIALS

The present invention is directed to a process for compression molding thermoplastic polymers reinforced with some continuous or near continuous strand reinforcement to produce molded parts having smooth surfaces and the smooth surfaced molded parts produced by the process.

The utilization of fiber reinforced plastics (FRP) in product manufacturing has increased to involve numerous and varied applications. For instance, in non-exterior applications (the FRP part is not used at the surface of a manufactured product), the stampable fiber reinforced thermoplastic materials continue to gain popularity in the product manufacturing industry. The absence of any required post-treatment curing step for these thermoplastic materials leads to facile processing techniques utilizing conventional stamping or compression molding machinery. The stampable thermoplastic FRPs generally use reinforcement which can be short fibers for injection molding applications and even continuous fibers or strands which are somewhat flowable for compression molding applications. Needled, continuous strand mat, chemically bound continuous strand mat and to some degree swirl continuous strand mat can flow with the thermoplastic matrix polymer when a laminate, (comprised of reinforcing strand and polymer matrix as a composite) of the reinforced thermoplastic is subjected to compression molding or stamping. The continuous strand mat provides integrity to the fiber reinforced thermoplastic laminate which is processed into molded FRP parts, and the mats contribute to higher strength properties of the FRP parts.

To date, the exterior applications of FRPs have involved thermosetting polymer matrices, like those in sheet molding compounds (SMC), to achieve a desired smooth surface approaching that of steel, which has traditionally been used on the exterior of many products. For instance, in exterior body panels for the automotive industry like in the Pontiac Fiero sports car, where a smooth surface is desired as opposed to an embossed surface as for some other types of products, the SMC materials are gaining wider acceptance. In sheet molding compound, the glass fiber reinforcement is present as short chopped glass fiber strands which disperse into filaments in the polymeric matrix, which is capable of further chemical reaction. This curing chemical reaction hardens the polymeric matrix while additives are present to overcome shrinkage engendered by the curing reaction. The result is a smooth-surfaced part having a surface that is substantially free of visible short glass fibers.

The product manufacturing industry would benefit from the availability of stampable or compression moldable fiber reinforced thermoplastics with facile processability of thermoplastics using conventional stamping presses. Attempts have been made to provide the industry with the benefits of thermoplastics that contain some continuous reinforcement while achieving a smooth-surfaced part. A problem that has surfaced is the surface prominence of some of the continuous reinforcement. The art has resorted to attempting to isolate any continuous reinforcement in the compression moldable thermoplastic laminate. Short chopped strands, finer diameter strands and filaments and monofilament mats, veil mats, and polymeric films have been used to isolate the reinforcing strands from the surface of the composite to give at least improved laminate surface properties if not smoother-surfaced parts. The presence of these isolating materials in the composite add an extra component to the composite and increase the complexity of the flowing of the reinforcement in the polymeric matrix during compression molding. Also, unfortunately, the presence of a smooth surface in a moldable laminate does not always translate into a smooth-surfaced, molded thermoplastic part. The abrogation of the necessity of using these materials or of obtaining improved surface properties over and above those produced with these materials would benefit the product manufacturing industry.

It is an object of the present invention to provide a process of compression molding thermoplastic polymeric matrices having some continuous strand reinforcement without the presence of separate isolating materials in the polymeric matrix while still achieving good surface properties in the molded part and even with the presence of isolating materials to obtain improved surface properties over and above those obtained with just the use of such isolating materials.

It is a further object of the present invention to provide molded parts having improved surface properties without relying upon isolating materials in the stampable thermoplastic reinforced with continuous strands.

SUMMARY OF THE INVENTION

Accordingly, the aforementioned objects and other objects gleaned from the disclosure herein are accomplished by the process and product by process of the present invention.

The process of producing molded parts of fiber reinforced thermoplastic laminates having some continuous fiber reinforcement involves: (1) preheating fiber reinforced laminates to a temperature at least to soften the matrix polymer and to expand the laminate, and (2) compression molding an effective charge of the preheated laminate while controlling the rheology by maintaining at least one of the mold surfaces at a temperature in the range of the glass transition temperature (Tg) of the matrix resin to a temperature of 70° F. (39° C.) lower than the Tg and at an effective pressure and effective time to produce the molded part. One or more laminates are preheated with any suitable heat source known to those skilled in the art. Compression molding is accomplished by any stamping press known to those skilled in the art adapted for maintaining a controlled temperature of at least one mold surface.

The production of the fiber reinforced laminate involves proper selection of materials and proper processing. The materials that are combined to yield the laminates are at least some continuous or near continuous glass fiber strand reinforcement and matrix polymer which is predominantly amorphous by virtue of the presence of amorphous regions. These materials are heated in combination to a temperature less than the decomposition temperature of the polymer to give the polymer a flowable viscosity and applying a superatmospheric pressure on the combination to producing a sheet of laminate. The amount of the continuous fiber or strand reinforcement in the laminate is generally less than 40 weight percent of the laminate when the filament has diameter of $4 \times 10^{-4}$ inch (10.2 micrometers).

DETAILED DESCRIPTION OF THE INVENTION

The incorporation of continuous or mechanically connected glass fiber reinforcement in a thermoplastic matrix polymer exacerbates the difficulty in obtaining a smooth-surfaced appearance for a molded part. In molding crystalline or semicrystalline thermoplastic polymers maximum flow of the polymer is obtained by heating the polymers above its melting point. After the polymer is formed to the desired shape, it is cooled through the crystallization temperature to obtain the solid polymer in the shape of the molded part. As a consequence, crystallites form near the surface of and throughout the molded part thereby detrimentally affecting the surface smoothness of the part. When crystalline, semicrystalline or amorphous polymers with reinforcing fibers of short lengths are molded by injection molding, the fibers align in the direction of flow of the polymer. This movement of the fibers diminishes any detrimental effect of such reinforcement on the surface of the molded part. In contrast, the compression molding of any thermoplastic polymer matrix with continuous fiber reinforcement involves some problem between the continuous reinforcement and the flowing polymer to prevent the molded part from having a smooth surface appearance.

We found that the problem interfering with the production of a smooth surface involves high shear stresses and shear deformations of the flowable thermoplastic polymer occuring at or near where the polymers contact the continuous reinforcement. A differential rate of flow occurs between the flowing thermoplastic polymer and the continuous reinforcement which is exacerbated by the longer molding time of compression molding compared to that of injection molding. Hence, although continuous reinforcement provides benefits in compression molding, the integrity of the reinforcement concomitantly adversely affects the reinforcement's flow rate. The integrity hinders the reinforcement in aligning in the direction of flow of the polymeric matrix. The distortions resulting from the high shear stresses and shear deformations travel to the surface of the part being molded. The surface of the part being molded may solidify while the part's interior is still flowing when the surface is in contact with a cold die surface. This in combination with the differential rate of flow results in the deformations at the surface of the part being frozen into the surface.

In our invention, the thermoplastic polymer having predominantly amorphous regions is used in preparing a laminate with continuous reinforcement. One or more of these laminates are preheated to at least soften the thermoplastic polymer. The resulting preheated laminate is molded under conditions of controlled rheology that are effected by controlling the temperature of at least one die surface of the mold to be in a temperature range of from the glass transition temperature of the thermoplastic polymer to a temperature of 60° F. (33° C.) less than that of glass transition temperature. It is believed, without limiting the invention that the predominantly amorphous polymer assists in reducing any irregular surface effects from crystallite formation and narrows the differential rate of flow with the reinforcement. The latter results from the high viscosities of the predominantly amorphous polymers. The temperature control on the surface of the die of the mold reduces any tendency of the surface of the moldable laminates to solidify while a high degree of polymer flow occurs internally within the moldable laminate. Now with our invention, the controlled rheology during molding counterbalances the seemingly inherent property of resistance to flow of the continuous reinforcement so that smoother-surfaced molded parts of continuous reinforced thermoplastic polymers are now achievable.

Various terms which are used herein are defined as follows for the purposes of the present invention:

"Stampable" means that the laminate is adaptable to be stamped in a mechanical stamping press. The use of such press is hereinafterdescribed.

"Composite" means a solid body formed from a plurality of materials.

"Blank" means a stampable composite of thermoplastic resin and glass fiber. In some cases a composite is used, as is, as the blank, and in other cases one or more blanks may be cut from a composite before being fed to the stamping press.

"Thermoplastic" means that the thereby described material, or composition, will soften or flow upon the application of heat and pressure thereto.

"Smooth" or "Smoothness" means a complete or relative lack of defects or irregularities in the surface of an article, where defects are of the type which are discernable by touch or by the naked eye, such as, pits, blisters, lakes, fiber pattern, waviness, orange peel, and the like. The sum total of such defects may be termed "Surface Roughness".

"Pit" is a pinhole type surface defect.

"Waviness" is a type of surface defect characterized by waves of long wavelengths.

"Gloss" is a reflective property of a painted or otherwise coated surface of an article and is inversely proportional to the roughness of such surface which can be measured in microinches by the use of a Microcorder instrument which is manufactured by Micrometrical Mfg. Co., Ann Arbor, Mich. (SPE Journal, August, 1964, pages 711-715).

"Orange Peel" is a type of surface defect in which the surface appears as the characteristic surface of an orange.

"Lake" is a type of surface defect which is a large shallow surface depression.

"Fiber Pattern" is a type of surface defect in fiber reinforced composites wherein a pattern of the fiber is visible or is physically present at the surface of the composite.

In controlling the rheology during the molding of the thermoplastic polymer reinforced with continuous reinforcement, the selection of the type of thermoplastic polymer is an important consideration. The thermoplastic polymer of our invention is a predominant amorphous polymer having substantial amorphous regions. These polymers range from those that are wholly amorphous homopolymers, copolymers, terpolymer, blends of polymers and polymer alloys to semicrystalline copolymers, terpolymers, blends and alloys, where the amorphous regions are greater than the crystalline regions. These polymers include homogeneous copolymers and compatible poly blends of amorphous and semicrystalline polymeric materials. The homogeneity and compatibility need not be for all proportions of the materials. Also included are the semi-compatible copolymers and polyblend systems the homopolymer portions show varying degrees of compatibility. Also included are the completely incompatible copolymer and polyblend systems having two glass transition temperatures (Tgs). Preferrably, the wholly amorphous polymers should have a reasonable melt viscosity to reduce increased energy input during compression molding via greater stamping pressures or stamping velocities. Included in the copolymers, terpolymers, blends of polymers and polymer alloys, there can be present small amounts of elastomeric polymeric materials. The copolymers, terpolymers, polymer blends and alloys can involve the several distinct polymer phases or regions donating their separate glass transitions so that the copolymer, terpolymer blends or alloys have primary, secondary glass transitions and so on. When the pressures used in compression molding of the reinforced thermoplastic laminate are around 6,000 psi or less, the thermoplastic polymer preferably has a flowable melt viscosity of less than around 20,000 poise. It is most preferred that the thermoplastic polymer is wholly amorphous and substantially free of any crystallinity. It is also preferred that when the molded parts are to be painted, the glass transition temperature of the flowable thermoplastic polymer is greater than the temperature of paint application. The meaning of the term "flowable thermoplastic polymer" refers to a thermoplastic polymer that flows when subjected to a temperature above the polymers glass transition temperature, but below its decomposition temperature and when subjected to a compression molding or stamping pressure of less than around 6,000 psi. By predominantly amorphous, it is meant that the polymer, copolymer, blend or alloy have up to around thirty (30) percent degree of crystallinity. The semi-crystalline polymeric materials should have a melt viscosity of less than around 30,000 and preferably 20,000 poise. Generally, the predominantly amorphous polymers do not include crystallizable polymers which are super cooled.

Nonexclusive examples of flowable thermoplastic predominantly amorphous polymers include: polyether imides; polycarbonates; polycarbonate-thermoplastic polyester blends, alloys and copolymers; polycarbonate/thermoplastic polyester blends, alloys, copolymers; polycarbonate/acrylonitrile/butadiene/styrene copolymers, terpolymer, blends, and alloys; polyphenylene oxide/polystyrene blends, alloys and copolymers, polyarylethersulfones; polyether sulfones; polyphenylene oxide/acrylonitrile butadiene styrene/polycarbonate blends, alloys and copolymers. In the aforementioned examples, nonexclusive examples of thermoplastic polyesters include one or more polyalkylene terephthalates such as copolyesters like polyethylene terephthalate and polybutylene terephthalate copolymers, blends and alloys. Also, the predominantly amorphous polymers include those polymers, copolymers, blends and alloys exhibiting a glass transition temperature of greater than around 100° C. and preferably greater than any temperature of use. The blends and alloys used as the predominantly amorphous polymers include those polymers which remain intimately combined in a blend or alloy when they are cooled and solidified. Therefore, blends and alloys that have components which either delaminate or separate when cooled or that have gross physical properties, chemical resistance, macroscopic appearance, and the like, clearly manifesting failure to form structurally useful composites are excluded from the predominantly amorphous polymers in this invention.

Strands of the sized glass fibers comprise the continuous reinforcement utilized in reinforcing the matrix polymer in the laminate. These are produced from molten streams of glass flowing from tips in a bushing containing molten glass. After the fibers cool to some degree, a chemical treating composition is applied to the fibers and the treated glass fibers are gathered into one or more strands and wound as one or more strands of continuous fibers into one or more multi-layered forming packages on a winder. The chemical treatment usually has one or more film forming polymers that are not incompatible with the matrix polymer and preferably has compatibility and solubility such that the treated glass fibers have good wet-out in the matrix polymer. Also the film forming polymer has a thermal decomposition temperature high enough to avoid decomposition of the polymer during processing and use. In addition, the chemical treating composition can have one or more inorganic-organic coupling agents like organofunctional silane coupling agents, one or more cationic lubricants in effective lubricating amounts and such additional components as: nonionic lubricants, wetting agents, emulsifiers and the like. Also the chemical treating composition can have a carrier for these components which is usually water in a major amount to make the chemical treatment an aqueous chemical treating composition. The chemical treating composition is applied to the glass fibers to give an effective add-on amount which is usually in the range of about 0.1 to about 10 weight percent LOI (Loss on Ignition). The glass fibers can be formed in a variety of diameters ranging from 1 micrometer (micron) to greater than 30 micrometers.

The continuous fiber or strand reinforcement is prepared from a plurality of the forming packages of the glass fiber strands by any method known in the art. By the use of the term "continuous", it is meant that all of the strand or strands on the forming package have a continual length through the many layers on the package, but there may be a few broken fibers or strands in the package. Typically, the packages are dried to reduce the moisture content and the strands are disposed on a moving conveyor belt to produce a continuous strand mat which is subsequently needled to produce mechanical entanglements. Rather than being needled, the continuous strand mat may have chemical bonds or links between fibers and/or stands generated by spraying the continuous strand mat with a chemical binder. The mat binder usually contains film forming resin, with or without an emulsifying agent, and with or without a coupling agent. The mat binder employed in making the coarse glass fiber mats from which the composites or the present invention are formed preferably allows some individual glass fibers in the composite to flow in relation to each other when the preheated laminate as a blank is being stamped in the stamping press. A non-exclusive example of producing needled glass fiber strand mat is that disclosed in U.S. Pat. Nos. 4,208,000 (Drummond); 4,315,789 (Tongel); and 4,404,717 (Neubauer et al.), all hereby incorporated by reference. In addition isolating layers of other fibrous materials may be used where such layers include: fine fiber mats, chopped fibers and stands. Although it is preferred that the laminate is essentially free of such isolating fiberous materials.

The stampable laminate or composite is prepared by distributing the flowable, predominantly amorphous thermoplastic resin throughout the reinforcing mat while placing the composite under heat and pressure. Useful methods of combining the thermoplastic resin, and reinforcing mat include: compression molding, extrusion, calendaring, extrusion laminating, extrusion coating, dip coating, powder impregnation or knife coating. These various techniques utilize different pressures. For example, the pressure employed in compression molding is about 25 to 3000 psig, and preferably 50 to 500, pounds per square inch (psi). For dip coating less pressure is required, since the glass strands are usually well impregnated with resin before lamination. The temperatures employed during the laminating procedure will depend on the softening and decomposition points of the thermoplastic resin. The temperature of laminating or impregnating is above the softening point and below the decomposition point of the resin. For semicrystalline polymers, the temperature is preferably above the melting temperature of the polymer. The process times will also vary depending on the polymeric material and process, and on the respective amounts of fibrous strand mat and resin that are employed. Generally, these processing times range from about 30 seconds to 30 minutes or longer depending on the components of the composites and the laminating procedure. Generally, in the compression lamination process impregnation of the mat with the thermoplastic polymer is accomplished through softening or melting of the thermoplastic polymer to a flowable viscosity under sufficient pressure and for sufficient time for a good wetting of the fibers of the reinforcing mat. The impregnation is not conducted at such conditions to produce excessive flow or exudation or the polymer from the body of the composite.

When amorphous polymers are the thermoplastic matrix polymer, the temperature of laminating is sufficiently greater than the softening point of the polymer to achieve a flowable viscosity. If the polymer is a blend or alloy having distinct glass transition temperatures for each polymer of the blend or alloy, the laminating temperature should be greater than the highest Tg of the polymer. If the polymer has a melting temperature (Tm), the laminating temperature should be greater than the Tm.

For the amorphous polymers, the desired flowable viscosity can be estimated by the WLF equation:

$$\text{viscosity at laminating temperature } (T_L) = \text{viscosity } (T_g) \exp \frac{-17.4 \, (T_L - T_g)}{51.6 + (T_L - T_g)}$$

For polymers that are crystalline and amorphous the equation is:

$$\text{Viscosity } (T_L) = \text{viscosity } (T_i) \exp \left[ E/R \left( \frac{1}{T_L} - \frac{1}{T_i} \right) \right]$$

where E is the activation energy:
and R is the universal gas constant.

Also the exact laminating temperature is dependent on the laminating pressure and time. If the pressure and/or time are increased to obtain a flowable viscosity for the polymer, the temperature need not be increased to much above the softening point of the polymer. Preferably the laminating temperature is at least 50° C. greater than the highest Tg of the polymer and less than the decomposition temperature of the polymer. In a continuous laminating process, the speed can vary to result in sufficient time for laminating. Nonexclusive examples of sufficient speeds range from 1 foot/min to 12 feet/min or more.

In forming the stampable laminate the thermoplastic resin is added to one to about 10 or more plies of the reinforcing mat. The thermoplastic resin is usually used in the form of a film or sheet having a thickness of about 0.002 to 0.125 inch. The term resin as used in this connection also includes all the adjuvants such as fillers and plasticizers, that may be used in forming the laminate and which are usually admixed with the resin prior to he impregnation of the fibrous strata with the resin.

Although the stampable composites of the present invention are usually formed from materials which are employed in laminate from, the term "composite" is used to characterize such materials rather than the term "laminate". This is because the resin laminae which are used lose their discrete laminate identity because the resin is caused to flow through and impregnate the strata of fibrous materials, as noted above. Thus the final product no longer has separate and distinct layers of resin and fibers, but is rather a composite of such materials.

The stampable composites generally have a thickness of about 30 to 200 or more mils. They usually have the shape or configuration of a film or sheet since such configurations are most suitable when the stampable composite is used as a blank in mechanical stamping presses for the preparation of stamped articles having other than an essentially planar or sheet-like configuration. After being formed, the stampable composites are cooled and removed from the equipment in which they are prepared and stored for future use. Nonexclusive examples of preparing the stampable composites include batch processes like those of U.S. Pat. No. 3,664,909 (Ackley) and continuous processes like those disclosed in U.S. Pat. Nos. 4,277,531 (Picone) and 4,355,176 (Baumann) where all of said patents are hereby incorporated by reference. In some cases the composite is used, as is, as the blank which is heat softened and then stamped in the mechanical stamping press. In other cases one or more blanks having sizes and configurations more suitable to the applications than those of the composite may be cut from the composite.

The surfaces of the unpainted, stamped or stampable composites of the present invention have a roughness which is equal to or less than about 50% of the roughness of the surfaces of the stamped composites that have previously been made. As measured by a Microcorder, stamped unpainted composites of the present invention have a surface roughness value of 20–60 microinches or less depending on surface configuration as compared to surface roughness values of 100 microinches or more for the surfaces of stamped unpainted composites which have been previously available. When painted, the stamped composites of the present invention will have surface roughness values acceptable for exterior automotive parts. The low surface roughness values of the painted stamped composites of the present invention is due to the smoothness of the surfaces of the stampable and stamped composites because such surfaces are relatively free of pits, orange peel, fiber pattern, lakes fiber pattern and similar surface defects. The surfaces of the painted, stamped composites of the present invention, moreover, retain their good surface properties during subsequent processing steps which are usually employed in the finishing of the painted stamped articles and which are usually employed at elevated temperatures, i.e., the baking of the painted or coated surfaces at elevated temperatures to cure or dry the paint or coating.

Stampable composites are preheated in a variety of shapes and sizes. Usually the composite is cut to convenient sizes and shapes suitable for meeting volume and dimensional requirements of finished molded parts. Preheating occurs in any type of oven known to those skilled in the art, but preferably occurs in an infrared oven and preferably involves the dissipation of moisture from the environment near the surface of the cut laminate. As in laminating, the temperature, and in a continuous preheating process, the heating rate is controlled so that the cut composites, commonly referred to as blanks, are softened for amorphous polymers and melted for semicrystalline polymer. With neither of the types of polymers is the preheating temperature or heating rate such as to exceed the decomposition temperature of the polymer. Preferably the temperature is greater than 50° C. above the highest glass transition temperature for the amorphous matrix polymer. Although pressurized ovens could be used, they are not necessary, but in the absence of pressure, temperatures higher than laminating temperatures or times longer than laminating times may be necessary to achieve the flowable viscosity for particular thermoplastic polymers comprising the matrix of the blank. Preferably, the heating rate for preheating is controlled in a continuous process by the speed of a conveyor carrying the blanks through an infrared oven or merely by residence time for ovens lacking conveyors. It is preferred that the heating rate and temperature be controlled so that the polymer approached as close as practical to the decomposition temperature of the polymer to decrease the polymer's viscosity and increase its flowability. Most preferably, the heating rate is around 2.5° to 3° F. per second.

One or more preheated blanks, depending upon the volume and dimensional requirements necessary to fill the mold to produce a finished molded part, are transferred to a compression molding press machine. The press machine has at least one die surface which can have its temperature controlled. If there is only one controlled die surface, the other surface is usually with 10 to 15 degrees of the controlled surface to permit facile mating of the mold surfaces. Preferably both die surfaces have the capability for temperature control. The die surfaces can be heated or cooled by any method known to those skilled in the art like electric or hot oil or steam heating for the former and chilled water for the latter. Depending on the particular thermoplastic polymer, the temperature of the die surfaces is regulated to be in the range of the Tg of the polymer to 60° F. (33° C.), 70° F. (39° C.) preferably, below the Tg of the polymer. The Th of the polymer is the highest Tg exhibited by differential scanning colorimeter or any other measurement method for Tg known to those skilled in the art. This temperature of the die surfaces is regulated within this temperature range at the time of stamping of the blanks.

In molding the amount of preheated blanks placed in the mold depends upon the volume and dimensional requirements of the final molded part and the flowability of the preheated composite. If the preheated composite has a more viscous thermoplastic polymer, it will be less flowable and will require more material placed in the mold to fill the mold to produce the molded part than if the composite had a more flowable polymer. To some degree, the flowability of the preheated blank can be varied with the stamping pressure or tonnage of the compression molding press. High tonnages and pressures will generate more flowability of a preheated blank with a higher viscosity polymer. The compression molding uses the energy of the press ram of the press machine to overcome the resistance to flow of the preheated composite in the mold. Therefore, even with the more flowable thermoplastic polymers in the blanks, a minimum energy must be supplied by the press ram to the preheated laminate that is greater than the resistance to flow of the composite in order to fill the part in the mold. Thus, the energy to be transferred equals the product of the tonnage and closing speed of the press machine. When the proper amount of heated blanks are positioned in the mold, the press begins to close with sufficient energy to overcome the resistance to flow of that amount of composite. Because the preheated composite is at a temperature above the softening point for amorphous polymers and above the melting point for semicrystalline polymers, the closing of the mold initiates the flow of the blanks. A minimum pressing speed recommended for hydraulic compression molding presses is 20 inches per minute (508 millimeters per minute), and speeds of about 80 inches per minute (2032 millimeters per minute) are preferred.

The energy supplied by the closing of the press ram overcomes the shear stresses developed from flow of the composite blank at a given shear rate. The more flow that is required to fill the part because of the lesser amount of preheated composite placed in the mold, the greater the shear stress than can be developed from the flowing polymer and the flowing reinforcing mat. Therefore, preheated composites that require a high degree of flow to fill the part and that contain a thermoplastic polymer with greater viscosity above the polymer's Tg will require closer regulation of the temperature of the die surfaces. This temperature regulation of the die surfaces is to alleviate fiber prominence near the surface of the part which is probably caused by the amorphous portion of the polymer shrinking around the fibers as opposed to the fibers poking through the composite. So, far the move viscous thermoplastic polymers, higher pressures, speeds or tonnages can be used in compression molding.

The duration of the stamping or the mold being closed is sufficient to produce the required amount of flow to fill the part for a given amount of material in the mold. During this time, the temperature control of the die surfaces prevents the surface of the preheated composite from cooling too rapidly to a temperature below its glass transition temperatures to solidify while internal portions of the preheated composite blank still have flowing polymer with its concomitant shear stresses that can be telegraphed as turbulence to the surface of the part. Generally, a high degree of flow to fill a part is involved when around 30% of the material needed to fill a part is placed in the die and the remaining 70% is added by flow during stamping. Generally, at least 5% flow of the material is desirable for efficient utilization of preheated composite blank. Once flow of the material begins during stamping, it should be completed before the blank cools to a uniform temperature below its glass transition temperature. As the blank cools, the polymer increases in viscosity and solidifies so all of the flow should be completed by the time the blank reaches a uniform temperature below its transition temperature and solidification occurs. The residence time necessary for the preheated composites in the mold is that required to solidify the part for removal from the mold. After this time, the press is opened and the part is removed. The compression mold should be designed to incorporate vertical telescoping shut-off (scaling) edges and equipped with a heavy-duty guidance system.

In the foregoing disclosure of laminating and stamping, the reference to the glass transition temperature of the polymer refers to the standard glass transition temperature where there is a rate increase in the increasing specific volume of a particular material in relation to increasing temperature so there is a discontinuity in the volume expansion curve. This discontinuity occurs over a temperature range and the glass transition temperature can be reported as the midpoint of that range. We refer to this midpoint temperature as the glass transition temperature for the temperature control of the die surfaces during molding. If the temperature at the onset of the discontinuity in the volume expansion curve is used as the glass transition temperature, then the temperature range for temperature control of the die surfaces during molding is a temperature in the range from the glass transition temperature up to a temperature of 50° F. (28° C.) less than the glass transition temperature. In any event, the glass transition temperature can be measured by any suitable method known to those skilled in the art such as nuclear resonance peak ratio or by approximation techniques like differential thermal analysis and differential scanning colorimeter.

Not only the composites that are produced, but also the molded parts produced in accordance with the process of the present invention have a smoother and less wavier surface when compared with parts molded outside the conditions of the process of the present invention. This is shown by comparing FIGS. 1 and 2 as further explained in a following section of this specification. This improvement holds for parts molded from composites having needed or chemically bound continuous strand mat where the fibers in composites that are compared have similar diameters. The improvement in surface smoothness of molded parts is further elucidated by the following preferred embodiment and examples.

PREFERRED EMBODIMENT OF THE INVENTION AND EXAMPLE 1

Figure 3:
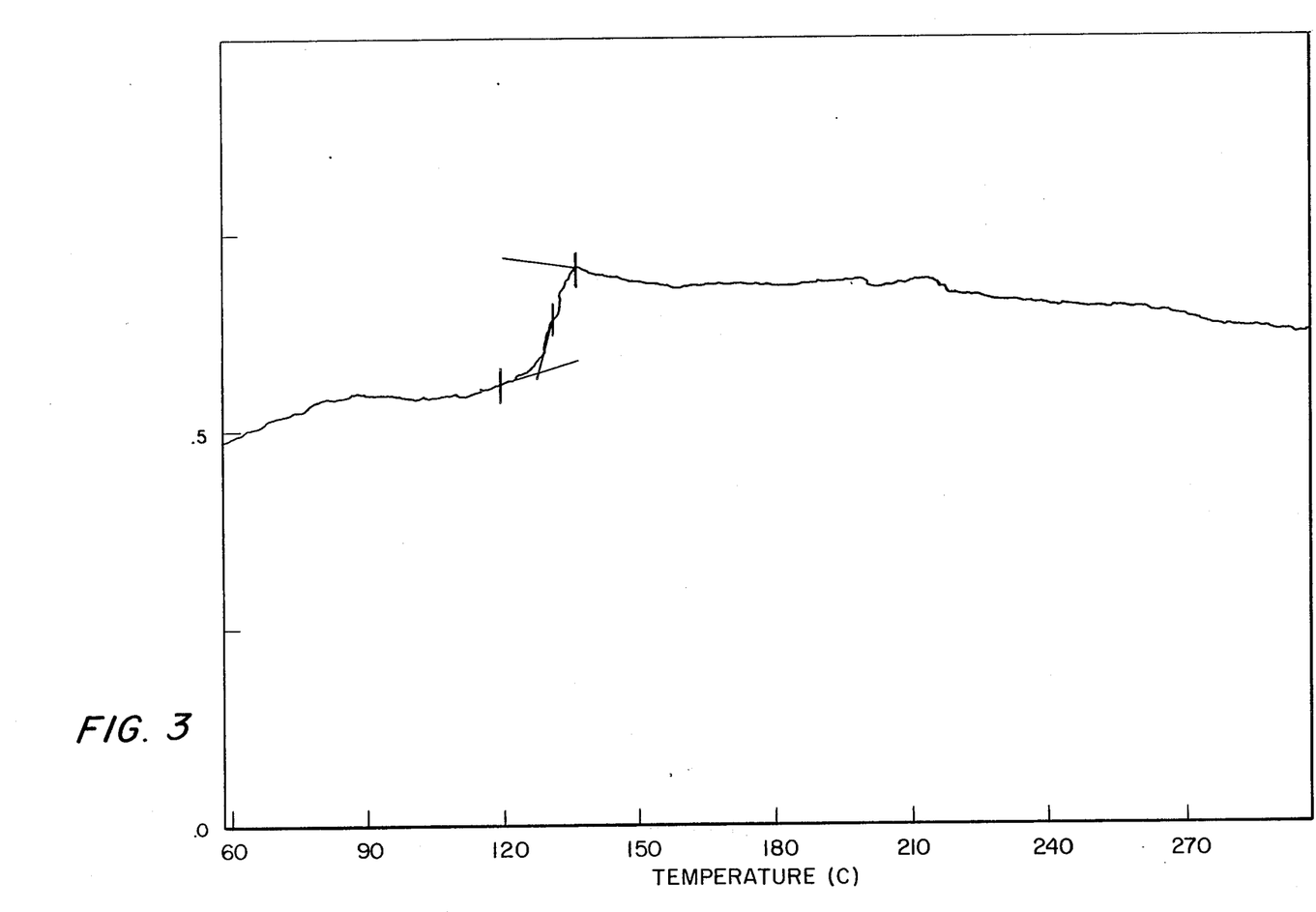
FIG. 3 is a differential scanning colorimeter curve of the polycarbonate/copolyester thermoplastic polymer alloy available from Mobay Chemical Corporation under the trade designation Merlon DP-1-1042.

Stampable composites were prepared from needled glass fiber strand mat and an alloy of miscible polymers of polycarbonate and thermoplastic polyester. The alloy is available commercially under the trade designation Merlon DP-1-1042 material from Mobay Chemical Company. This polymer has a Tg an Tm by differential scanning colorimeter of 130° C. as shown in FIG. 3.

The needled mat was prepared from chemically sized glass fibers having a G-75 strand construction. The sizing was a dried residue of an aqueous mixture of a thermoplastic film forming polymer, having a decomposition temperature greater than 300° C., an organic-inorganic coupling agents like an organo-functional silane coupling agent, a cationic lubricant and water in a major amount of the aqueous sizing composition. The strands had an amount of the dried residue of the sizing equivalent to 1.14 weight percent (LOI) less on ignition basis The needled mat was prepared with 25 gauge needles, utilizing 195 penetrations/square inch. The needled mat had a density of 1.5 oz/ft$^2$ (458 gm/m$^2$).

The needled mat and overlay and underlay film layers of the polycarbonate/thermoplastic polyester polymer were hand laminated. The laminating temperature was 510° F. (266° C.), and the pressure was 70 pound/inch$^2$, and the force was 10,000 pounds. The cycle time for laminating was 6 minutes as the cooling time. Before laminating, the polymer was dried overnight at 185° F. (85° C.) at 28 in or mercury vacuum, and the needled mat was dried in a microwave oven. Seven samples measuring 12 inches had the following glass contents in weight percent:

| Sample | Weight Percent |
| --- | --- |
| 1 | 29.7 |
| 2 | 23.9 |
| 3 | 19.9 |
| 4 | 19.7 |
| 5 | 19.7 |
| 6 | 34.3 |
| 7 | 34.8 |

Sample 2 had a tensile strength of $8.6 \times 10^3$ psi, a percent elongation of 1.6 percent and a flexural strength of $27.6 \times 10^3$ psi, where all of the tests were standard ASTM tests.

Two more composite samples were prepared with a different needled mat. This mat differed from the type used for the first seven samples in that it was needled with 19 gauge needles. These composite samples were preheated for seven minutes, at a temperature of greater than 550° F. (288° C.) in an infrared type of oven.

Preheated laminate samples 1, 2 and 3 were combined as were samples 4 and 5 and samples 6 and 7 and the last two samples, 8 and 9, to make four stamped parts. The die surface of the mold had a temperature of 205° F. (96° C.) or 33.89° C. below the Tg of the polymer for the first and second molded samples. For the third molded sample, the die surface temperature both top and bottom was 195° F. (90.56° F.) or 39.4° C. below the polymer's Tg. The fourth sample was molded with the die surfaces having a temperature of 185° F. (85° C.) or 45° C. or 85° F. below Tg. The stamping tonnage was 1945 psi and the compression molding time was 90 seconds.

In molding the parts were filled by the flowing composite, and surface of the parts were tested for gloss (smoothness or surface roughness) by a standard optical method with a glossmeter according to test ASTM D-523-60° Gloss. The results were:

| Molded Sample | Gloss |
| --- | --- |
| 1 & 2 | 91 |
| 3 | 48 |
| 4 | 28 |

Figure 1:
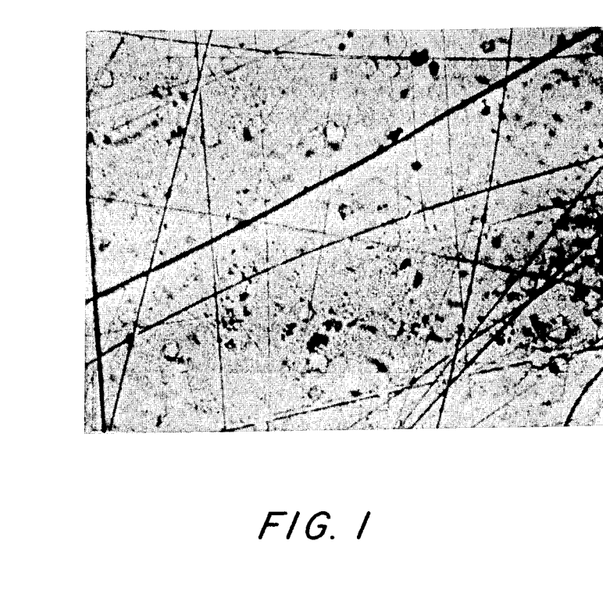
FIG. 1 is a photograph of the surface of a compression molded thermoplastic article magnified 100 times wherein the reinforcement was needled glass fiber strand mat and the matrix polymer was a polycarbonate/copolyester amorphous polymer and the composite mold surface temperature was 205° F. (96° C.) which is equal to the glass transition temperature minus 60° F. (33.4° C.).
Figure 2:
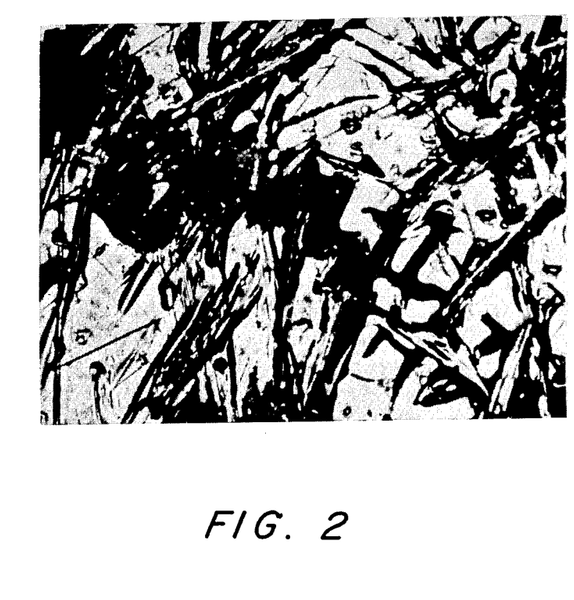
FIG. 2 is a photograph of the surface of a compression molded fiber reinforced thermoplastic article magnified 100 times wherein the reinforcement was needled glass fiber strand mat in an amount of 30 weight percent of the article and the matrix was a polycarbonate/copolyester amorphous polymer and the mold surface temperature was 180° F. (82.2° C.) which is equal to the glass transition temperature of the matrix resin minus 85° F. (47.24° C.).

The results show the improved surface smoothness with molding of the composite at a die surface temperature of Tg-60° F. or Tg-34° C. This is confirmed in the photographs of FIGS. 1 and 2. These photographs are plane views of the surfaces of the molded samples 2 and 4 magnified 100 times. FIG. 1, a surface having a gloss value of 91 has much less roughness than that shown for the sample in FIG. 2 for the surface having a gloss value of 28.

EXAMPLE 2

Stampable lam nates were prepared from needled glass fiber strand mat and Xenoy 5220 thermoplastic polymer available from General Electric Company. This polymer has polycarbonate/polybutylene terephthalate and an elastomer, and gave glass transitions in a differential scanning calorimeter curve at 10° C./minute as follows:

Primary Tg—270° F. (132° C.)
Secondary Tg—120°-130° F. (49°-54° C.)
Melting temperature—440° F. (227° C.)
Crystallization temperature—345° F. (174° C.)

The needled mat of glass fiber strand was prepared in a manner similar to that of Example 1. The needled mat was prepared with 19 gauge needles, utilizing 120 penetrations/square inch with 20 mm needle penetration depth. The needled mat had a density of 2.0 oz/sq. ft. (610 gm/m²).

Eighteen samples of composites were prepared in a similar manner as in Example 1 except the temperature was 540° F. (282° C.), the laminating time was 10 minutes and the tonnage was 10 tons. These eighteen samples had the following wt % glass;

| Laminate | Glass Wt. % |
| --- | --- |
| 1 | 39.3 |
| 2 | 38.0 |
| 3 | 38.6 |
| 4 | 39.4 |
| 5 | 39.1 |
| 6 | 37.4 |
| 7 | 37.7 |
| 8 | 37.9 |
| 9 | 38.4 |
| 10 | 38.9 |
| 11 | 38.8 |
| 12 | 38.0 |
| 13 | 39.2 |
| 14 | 38.8 |
| 15 | 39.3 |
| 16 | 38.2 |
| 17 | 40.4 |
| 18 | 39.7 |

The eighteen composite samples were preheated at a temperature of 540° (282° C.) for a time of 5 minutes to produce a melt viscosity of around 5,000 poise. These composite samples were combined usually in groups of two to prepare 10 molded samples. Compression molding was performed on a St. Lawrence press machine with a 12×12 inch mold. The stamping tonnage used was 140 and the closed press time was 1.20 seconds. Table 1 presents data of the molding of these samples along with their resulting surface and warp properties.

TABLE 1

| Sample (composites)[1,2] | Mold Temperature (°F.) | Mold Area Coverage (%) | Budd Surface Analysis[3] | Distinctiveness of Image Analysis | Warp (mm) |
| --- | --- | --- | --- | --- | --- |
| A (15 & 16) | 120-130 | 100 | 620 | 15 | 1 |
| B (17) | 220 | 100 | 390 | 44 | 1 |
| C (11 & 12) | 310 | 100 | 775 | 39 | 5 |
| D (13 & 14) | 120-130 | 69 | 170 | 34 | 0 |
| E (1 & 2) | 220 | 69 | 230 | 58 | 0 |
| F (9 & 10) | 300 | 69 | 385 | 41 | 3 |
| G (5 & 6) | 220 | 34 | 345 | 53 | 1 |
| Nonreinforced Xenoy 5220 polymer | | | | 93 | — |

[1]Xenoy 5220 Primary Tg = 270° F. Secondary Tg = 120° F. to 130° F.
[2]Glass Weight Percent = 30% to 40%
[3]Distinctness of Image on painted part Table 1 shows from Examples A through C that with 100% area coverage of the mold, resulting in 0 flow during stamping, the most distorted sample via Budd analysis is obtained. In the absence of flow, nonuniformities in the composite cannot be corrected. Mold surface temperature is an important variable in terms of warp. A mold temperature higher than the primary Tg of the Xenoy 5220 polymer results in excessive warp and lowering the mold temperature from below the primary Tg to below the secondary Tg (120° F. to 130° F.) did not further reduce warp. The data at 69% mold coverage illustrate the importance of temperature on part distortion. The Budd analysis data show that lowering the mold temperature below the primary Tg reduces distortion. Lowering the temperature below the secondary Tg gave an even lower level of distortion; however, the distinctiveness of image values for the painted parts are lowest for the two samples molded at the secondary Tg of 120° F. to 130° F., and fiber prominence was worse at this lower temperature. An increase in the amount of flow from 34% area coverage of the mold did not further improve the molded part surface quality. The best surface resulted when some flow occurred from 69% coverage at a mold temperature of 220° F. which is between the primary and secondary Tg of the resin and 50° F. below the primary Tg.

In Table 1, the Budd surface analysis is a quantitative test of surface waviness by a mechanical method designed by Budd Plastic Company for SMC development. The analyzer has a maximum one-foot transverse distance. The Distinctiveness of Image analysis test is conducted with a Distinctness of Image meter which illustrates a spot of less than one-half square inch area and measure appearance attributes of the surface that are a result of the level of surface roughness and waviness. Both tests were conducted by methods known to those skilled in the art.

We claim:

1. Process of molding fiber reinforced thermoplastic parts having at least one smooth surface, comprising:

preheating at least one laminate of predominantly amorphous thermoplastic polymer, copolymer, terpolymer, blend or alloy that is reinforced with glass fiber strand reinforcing mat selected from the group consisting of needled, continuous glass fiber strand mat, chemically bonded glass fiber strand mat, and continuous glass fiber strand mat where the mat is present in an amount in the range of less than 40 weight percent of the laminate where preheating is at an effective temperature that is in the range of less than the degradation temperature of the polymer to a temperature to at least soften the amorphous polymer and to melt any semicrystalline polymer whereby the polymer has a viscosity less than 20,000 poise and whereby the laminate expands; and molding an effective charge of the heated laminate by compression molding at a pressure in the range of about 500 to about 6,000 psi and with at least one mold surface at a temperature in the range of from the Tg temperature to 70° F. (39° C.) below the Tg temperature of the polymer to reduce the shear modulus at the surface of the laminate contacting said mold surface to produce the molded, reinforced, predominantly amorphous thermoplastic part.

2. Process of claim 1, wherein the temperature of preheating is at least 50° F. (28° C.) above the glass transition temperature of the polymer.

3. Process of claim 1, wherein the temperature of preheating is greater than the melting temperature of any primary crystalline phase present in the polymer.

4. Process of claim 1, wherein the predominantly amorphous thermoplastic polymer is a polycarbonate/polyester polyblend having the differential scanning "calorimeter" curve of FIG. 3.

5. Process of claim 1, wherein the predominantly amorphous thermoplastic polymer is selected from the group consisting of: polyether imides; polycarbonates; copolymer, polyblends and polymer alloys of polycarbonate and thermoplastic polyesters including polyalkylene terephthalate selected from polyurethane terephthalate and polybutylene terephthalate and mixtures thereof; and copolymers, polyblends, and alloys of polyphenylene oxide and polystyrene; and copolymers, polyblends and alloys of polycarbonates, acrylonitrile and of butadiene and styrene.

6. Process of claim 1, wherein the effective charge of the heated laminate to molding is sufficient to allow for at least five percent flow of the laminate to fill and mold during compression to produce the part.

7. Process of claim 1, wherein the reinforcing mat is selected from the group consisting of needled glass fiber strand mat and chemically bound continuous glass fiber stand mat, wherein the fiber diameters of the glass fibers range from 5 micrometers to greater than 30 micrometers.

8. Process of claim 1, which includes preparing the laminates to be preheated and molded by combining at least one ply of reinforcing mat between at least two plies of the predominantly amorphous thermoplastic polymer under pressure at a temperature in the range of at least 50° F. (28° C.) greater than the glass transition temperature of the polymer and to a temperature of less than the decomposition temperature of the polymer.

9. Process of claim 1, wherein the predominantly amorphous thermoplastic polymer is a homogeneous wholly amorphous polymer, copolymer, polyblend or polymer alloy, and where one or more of the preheated laminates are transferred to molding in a manner to avoid any substantial decrease in temperature of the laminate and concomitant increase in the laminate's viscosity.

10. Process of claim 1, wherein the predominantly amorphous thermoplastic polymer is a semicrystalline polymer exhibiting at least two glass transition temperatures because of the several components of the polymer, and wherein the laminate is preheated at a temperature above the highest melting temperature of the semicrystalline polymer and wherein the heated laminate is molded at a temperature in the range between the glass transition temperature of the dominant component of the semicrystalline polymer to a temperature of 60° F. (33° C.) less than said glass transition temperature.

11. Process of claim 1, wherein the laminate is essentially free of any surfacing fiber mat and separating polymeric film.

12. Process of claim 1, wherein the predominantly amorphous polymer in the preheated laminate has a viscosity of less than 20,000 poise.

13. Process of claim 1, wherein the predominantly amorphous polymer has a glass transition temperature greater than 100° C.

14. The molded fiber reinforced thermoplastic part produced by the process of claim 1.

15. Process of molding glass fiber reinforced thermoplastic parts having at least one smooth surface, comprising:

a. preheating laminates of at least one ply of glass fiber strand reinforcing mat selected from needled continuous strand mat and chemically bonded mat, where the mat is positioned between at least two plies of a substantially amorphous polymer, copolymer, terpolymer, blend or alloy, wherein the glass fiber strand mat is present in an amount less than 40 weight percent of the laminate, and wherein preheating is at a temperature of around 100° C. greater than the polymeric glass transition temperature for a wholly amorphous polymer, copolymer, terpolymer blend or alloy and at least at the melting temperature of a semicrystalline polymer, copolymer, terpolymer blend or alloy to give the polymer a flowable viscosity and whereby the laminate expands, and b. molding an effective charge of the preheated laminate to yield at least 5 percent flow of the laminate by compression molding at a pressure of about 500 to about 6,000 psi where at least one surface of the mold are maintained at a temperature in the range of from the glass transition temperature of the polymer to a temperature of 60° F. (35° C.) below the glass transition temperature of the polymer to produce the molded, reinforced, predominantly amorphous thermoplastic part.

16. Process of claim 15, wherein the amorphous polymer is a compatible copolymer, blend or alloy of polycarbonate and copolyester having a differential scanning colorimeter curve of FIG. 3.

17. Process of claim 15, which includes producing the laminate to be preheated at a temperature in the range of at least 100° C. higher than the glass transition temperature of the polymer and of less than the decomposition temperature of the polymer and at an elevated pressure and for a sufficient period of time to allow the polymer to impregnate the glass fiber strand mat.

18. The molded fiber reinforced thermoplastic part produced the process of claim 15.

19. The glass fiber strand reinforced polycarbonate/copolyester thermoplastic polymeric part produced by the process of claim 16.

20. Process of molding fiber reinforced thermoplastic parts having at least one smooth surface, comprising:
a. preheating laminates of a semicrystalline, thermoplastic polymer, copolymer, terpolymer, blend or alloy having around 50% polybutylene terephthalate, 45% polycarbonate and 5% elastomer that is reinforced with a reinforcing glass fiber strand mat selected from the group consisting of needled continuous strand mat, and chemically bonded mat in an amount in the range of less than 40 weight percent of the laminate at a temperature greater than the melting point of the polymer but less than the decomposition temperature of the polymer to render the polymer to have a flowable viscosity of less than around 20,000 poise and to expand the laminate, and
b. molding and effective charging of the heated laminate by compression molding to obtain at least 5% flow of the laminate at a pressure of about 500 to about 6,000 psi and where at least one die surface of the mold is maintained at a temperature in the range from about the glass transition temperature of the poly(butylene terephthalate) to a temperature of 60° F. (33° C.) less than said glass transition temperature and greater than the lowest glass transition temperature exhibited by differential scanning colorimetry for the polymer between the primary and secondary glass transition temperature of the resin to produce the molded, reinforced, semicrystalline thermoplastic part.

21. Process of claim 20, wherein the laminates to be preheated are produced under pressure at a temperature greater than the melting point of the polymer.

22. Molded glass fiber reinforced thermoplastic parts produced by the process of claim 20.

23. Process of claim 20, wherein the temperature regulation of the at least one die surface of the mold during molding results in controlled rheological conditioning of the part being molded.

* * * * *

UNITED STATES PATENT AND TRADEMARK OFFICE
CERTIFICATE OF CORRECTION

PATENT NO. : 4,950,532
DATED : August 21, 1990
INVENTOR(S) : Balbhadra Das, Narasimhan Raghupathi and Thomas V. Thimons It is certified that error appears in the above-indentified patent and that said Letters Patent is hereby corrected as shown below:

Claim 6, column 15, line 61, delete the word "and" and insert --the--.

Claim 18, column 17, line 13, insert the word --by-- after produced.

Claim 20, column 18, line 5, delete the word "and" and insert --an--.

Claim 20, column 18, line 16, delete the word "temperature" and insert --temperatures--.

Signed and Sealed this

Twenty-seventh Day of August, 1996

Attest:

BRUCE LEHMAN

*Attesting Officer*  *Commissioner of Patents and Trademarks*